United States Patent [19]

Logan

[11] 4,018,115

[45] Apr. 19, 1977

[54] SELF-CENTERING STEADY REST FOR A MACHINE TOOL

[75] Inventor: Francis D. Logan, Houston, Tex.

[73] Assignee: Camco, Incorporated, Houston, Tex.

[22] Filed: Mar. 29, 1976

[21] Appl. No.: 671,216

[52] U.S. Cl. .................................................. 82/39
[51] Int. Cl.² ........................................ B23B 25/00
[58] Field of Search ............................. 82/39, 38 R

[56] References Cited

UNITED STATES PATENTS

| 258,910 | 6/1882 | Fuller | 82/39 |
| 568,551 | 9/1896 | Vierengel | 82/39 |
| 2,194,638 | 3/1940 | Caldwell | 82/39 X |
| 3,234,829 | 2/1966 | Dinsmore | 82/39 |
| 3,535,963 | 10/1970 | Dietl | 82/38 |
| 3,750,499 | 8/1973 | Peasley | 82/39 |

Primary Examiner—Leonidas Vlachos

[57] ABSTRACT

A self-centering steady rest for supporting the free end of a cylindrical workpiece held in a chuck in a machine tool coaxially with the chuck axis. A first support including a pair of supporting rollers positioned on one side of the axis of the chuck and a second support including a second pair of supporting rollers positioned on the opposite side of the axis of the chuck from the first support. The opposing pairs of rollers are supported an equal distance from the axis of the chuck. Actuating means is connected to the first and second supports for simultaneously and equally moving the first and second supports and rollers towards the axis of the chuck for engaging and supporting the free end of the workpiece coaxially with the chuck axis. Preferably the first and second supports move in tracks in a base adapted to be slidably and movably secured to the ways of the machine tool for positioning the first and second supports adjacent the free end of the workpiece. Preferably each pair of supporting rollers is connected to an insert removably connected to one of the first and second supports whereby different sets of rollers may be connected to support different ranges of workpiece sizes.

4 Claims, 4 Drawing Figures

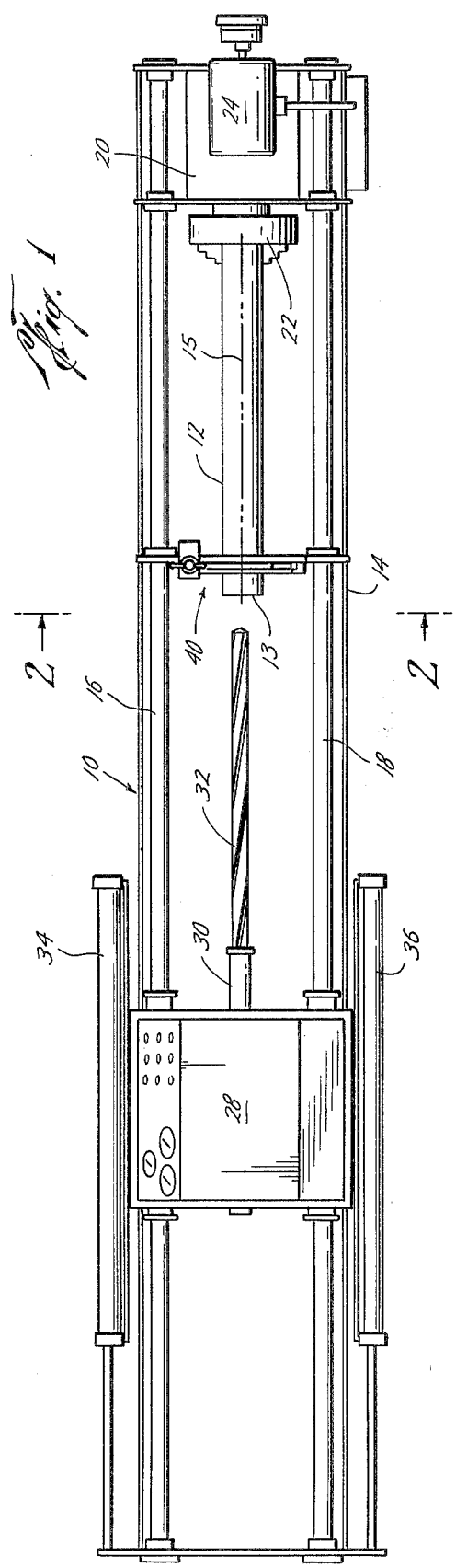
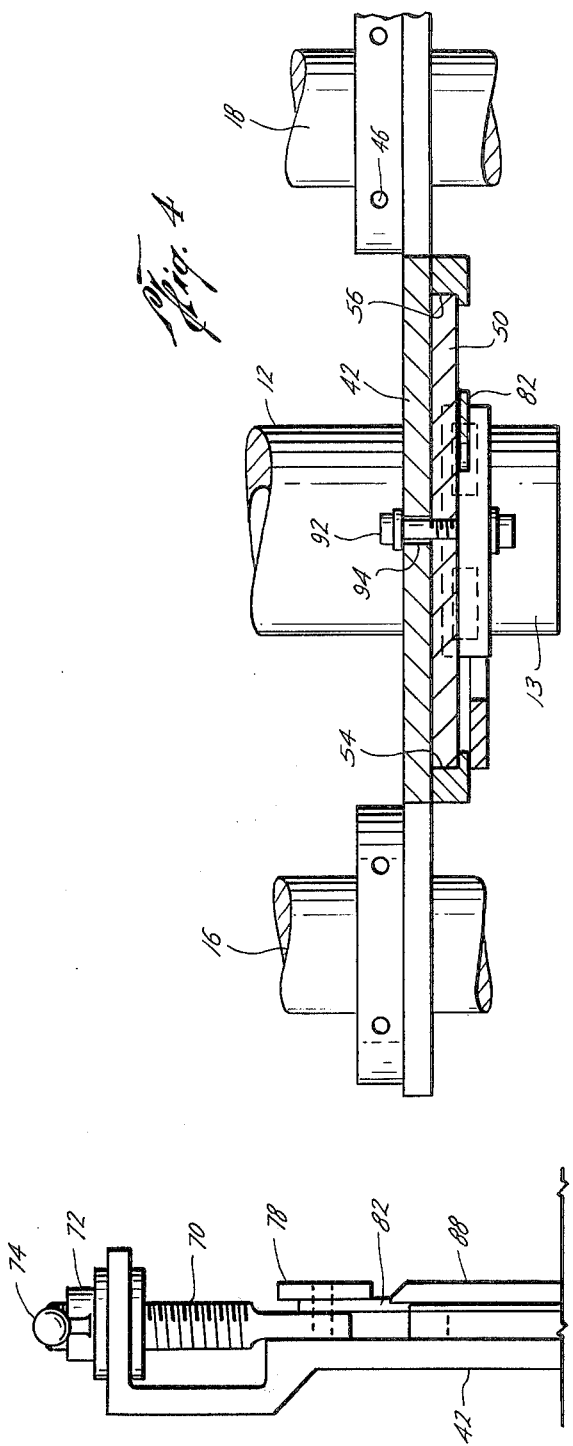

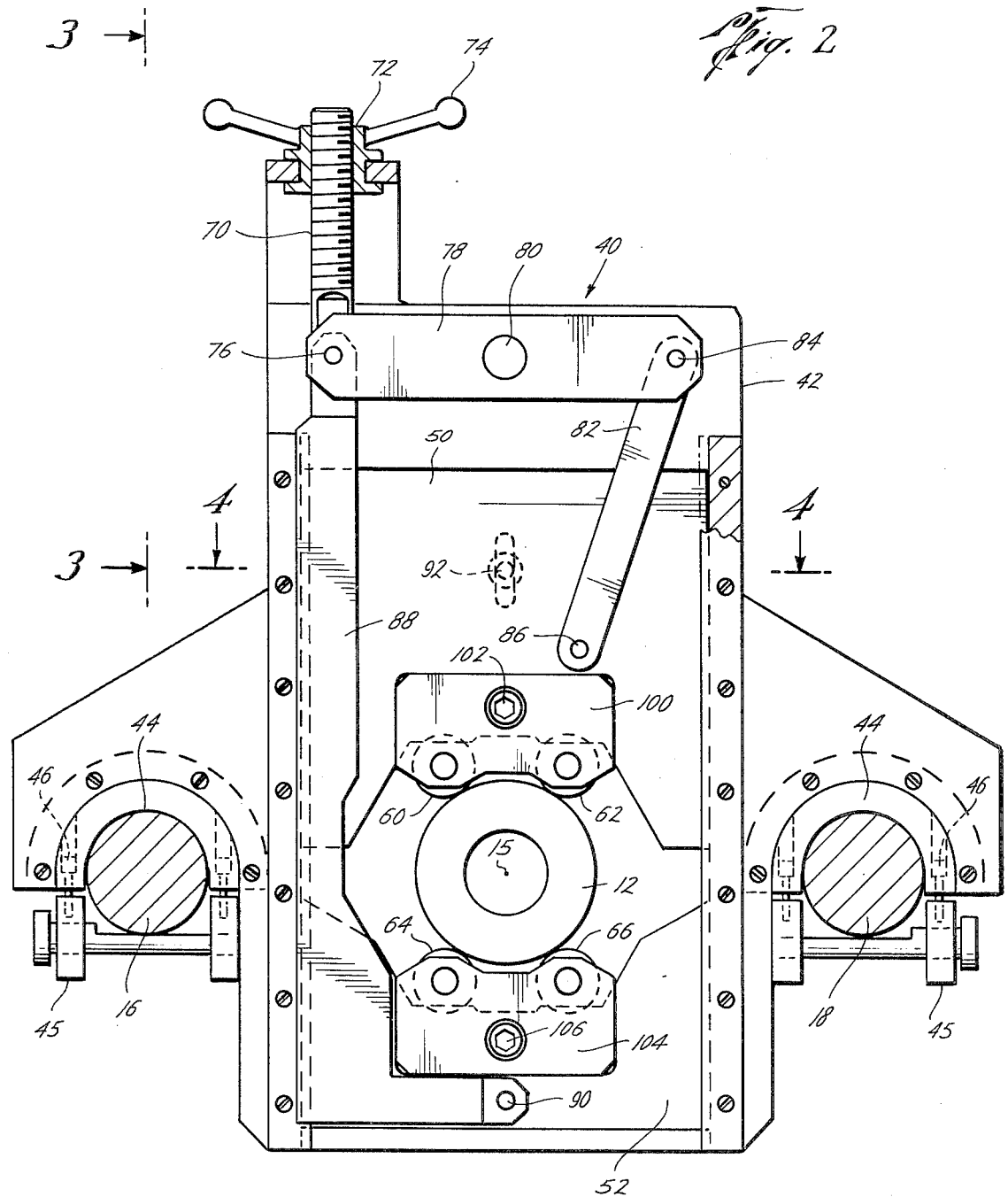

SELF-CENTERING STEADY REST FOR A MACHINE TOOL

BACKGROUND OF THE INVENTION

In various types of machine tools, a chuck is utilized to grip, hold and rotate one end of a workpiece upon which the machine tool performs one or more operations. However, because of the length of some workpieces, it is frequently desirable to support the free end of the workpiece. Generally, such devices supporting the free end of the workpiece, commonly known as steady rests, are manually adjustable and require a considerable amount of time to set up in order to hold the workpiece coaxially aligned with the axis of the chuck. The only available self-centering steady rest of which the applicant is aware is a complicated and expensive three-roller cam actuated device.

The present invention is directed to a simple but effective self-centering steady rest which quickly and accurately will engage and support the free end of a cylindrical workpiece held in a machine tool and accurately aligns the workpiece with the axis of the chuck of the machine tool.

Summary

The present invention is directed to a self-centering steady rest having a base adapted to be secured to the machine tool which in turn carries a first support and a second support. Each support includes a pair of supporting rollers which are mounted on opposite sides of the axis of the chuck of the machine tool and means are connected to the first and second supports for simultaneously and equally moving the first and second supports towards the axis of the chuck for engaging and supporting the free end of the workpiece coaxially with the chuck axis.

Yet a further object of the present invention is the provision wherein the first and second supports are positioned for supporting the first and second pairs of rollers an equal distance from the axis of the chuck whereby the free end of the workpiece is axially aligned with the chuck regardless of whether the workpiece is undersized or oversized.

Still a further object of the present invention is the provision of removably connecting each pair of supporting rollers to one of the first and second supports whereby different sets of rollers may be connected to support different ranges of workpiece sizes.

Yet a further object of the present invention is the provision of movably and slidably supporting the steady rest from and releasably secured to the ways of the machine tool for positioning the rollers adjacent the free end of the workpiece.

A still further object of the present invention is the provision of moving the first and second supports towards and away from the axis of the chuck by a worm gear and coacting rotatable nut which also serves to hold the supports in a set position against the workpiece.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is a top elevational view of a drilling machine using the present invention, FIG. 2 is an enlarged elevational view taken along line 2—2 of FIG. 1 of the apparatus of the present invention, FIG. 3 is a view taken along the line 3—3 of FIG. 2, and FIG. 4 is a view taken along the line 4—4 of FIG. 2.

DESCRIPTION OF THE PREFERRED EMBODIMENT

For purposes of illustration only, the self-centering steady rest of the present invention will be described as used on a drilling machine; however, it is to be understood that the present invention is useful on other types of machine tools for supporting the free end of the workpiece.

Referring now to the drawings, and particularly to FIG. 1, the reference numeral 10 generally indicates a drilling machine for drilling holes, for example only, of up to 5 inches in diameter and 6 feet long in a workpiece 12. The apparatus 10 generally includes a machine base 14 which supports a pair of ways 16 and 18, which may be circular steel rods extending along the length of the machine 10. A headstock 20 is secured to the ways 16 and 18 and includes a workpiece holding chuck 22 having an axis 15 positioned in the middle of the support ways 16 and 18. A motor 24 is provided driving a set of gears for conventionally rotating the chuck 22 at a selective rate of rotation.

A drill tool support 28 is slidably supported from the ways 16 and 18 for horizontal movement along the ways and the support 28 includes a drill spindle 30 for holding a suitable drill tool 32. Hydraulic piston and cylinder assemblies 34 and 36 are connected to the tool support 28 on opposite sides of the drill spindle 30 for moving the tool support 28, the spindle 30 and the drill tool 32 towards and away from the rotating workpiece 12, one end of which is held in chuck 22. For a more complete description of the drilling machine 10, reference is made to patent application Ser. No. 630,250, filed Nov. 10, 1975, entitled "Drilling Machine".

It is important that the free end 13 of the workpiece 12 be additionally supported other than by the chuck 22. The present invention is directed to providing a steady rest, generally indicated by the reference numeral 40 for supporting the free end 13 of the workpiece 12 as well as centering the workpiece 12 with the axis of the chuck 22 to insure that the hole drilled by the drill 32 is straight and centered in the workpiece 12.

Referring now to FIGS. 1, 2 and 4, steady rest 40 includes a base 42 adapted to be secured and supported from the drilling machine 10, and preferably from the ways 16 and 18. Preferably, the frame 40 includes slidable members 44 coacting with and slidable on the ways 16 and 18 whereby the steady rest 40 may be moved along the ways 16 and 18 to a position adjacent the free end 13 of the workpiece 12 for supporting the free end. In addition, the base 42 includes suitable clamping means 45 including screws 46 for releasably securing the base 42 to the ways 16 and 18.

A first support 50 and a second support 52 are provided and are slidably carried by the base 42 in side tracks 54 and 56. The first support 50 includes a pair of supporting rollers 60 and 62 and the second support 52 also includes a pair of supporting rollers 64 and 66. It is to be particularly noted that the first support 50 and rollers 60 and 62 are positioned on one side of the longitudinal axis 15 of the chuck 22 and that the second support 52 and supporting rollers 64 and 66 are positioned on the opposite side of the longitudinal axis of the chuck 22 from the first support 50. In addition, the rollers 60 and 62 are positioned the same distance from the longitudinal axis 15 as the distance between the rollers 64 and 66 and the longitudinal axis 15 of the chuck 22. Therefore, so long as the first support 50 and the second support 52 are moved simultaneously and an equal amount, the first pair of rollers 60 and 62 will be the same distance from the axis 15 as the second pair of rollers 64 and 66 to accurately center the free end 13 of the workpiece 12 on the longitudinal axis 15.

Suitable actuating means are provided for simultaneously and equally moving the first 50 and second 52 support towards the axis 15 for engaging and supporting the free end 13 of the workpiece 12. The actuating means may include a worm gear 70 and a coacting nut 72 connected to and actuating handle 74. Rotation of the wheel 74 will raise and lower the worm gear 70. The worm gear 70 in turn is connected to a pivot 76 which upon actuation in one direction moves both the first support 50 and the second support 52 towards the axis 15 and movement in the other direction moves the first and second supports 50 and 52 away from the axis 15. Movement of the first support 50 is provided by a lever 78, which pivots around pin 80, and one end of which is connected to the pivot 76 and the second end of which is connected to an arm 82 through pin connection 84. The arm 82 is connected by a pivot point 86 to the first support 50. The lever arm 78 pivots in its center about the pin 80 and therefore pivot point 84 moves equally but in an opposite direction to the movement of the pivot pin 76. The first support 50 will not move in the exact amount of the movement of pin 76 since the pivot point 86 is not vertically aligned with the pin connection 84; however, the difference in movement is insignificant and it is preferable to have the pivot point 86 more in the center of the first support 50 so that it may more easily move in the slides 54 and 56 of the base 42.

The second support 52 is moved by an L-shaped arm 88, one end of which is connected to the pivot 76 and the second end of which is connected to a pin 90 connected to the second support 52.

While other types of actuating means may be used in place of the worm gear 70 and nut 72, such as a pneumatic piston and cylinder assembly, the worm gear 70 and nut 72 not only move the first support 50 and second support 52 equally towards and away from the axis 15, but act to secure and hold the supports 50 and 52 in place when the rollers 60, 62, 64 and 66 engage a workpiece 12. However, if additional locking means is desired, a set pin 92 is provided which threadably engages the first support 50 and moves in a slot 94 in the base 42 and which is screwed tightly up when the rollers engage a workpiece 12 to maintain the first support 50, and consequently the second support 52 more securely fixed relative to the base 42.

While the pairs of rollers 60 and 62 and 64 and 66, as shown, will accommodate a certain range of workpiece sizes, it may be desirable to provide different sized and spaced rollers to accommodate other ranges of sizes of workpiece 12. Therefore, it is preferable that each pair of rollers is connected to an insert which is removably connected to one of the first and second supports 50 and 52 whereby different sets of rollers may be connected to engage and support a different sized workpiece 12. Thus, the pair of rollers 60 and 62 is connected to an insert 100 which is removably connected to the first support 50 by a bolt 102. And the second set of rollers 64 and 66 is connected to an insert 104 which is removably connected to the second support 52 by a bolt 106. Therefore, if desired, the inserts 100 and 104 may be interchanged with other inserts for changing to different sized and spaced pairs of rollers.

In use, the supports 50 and 52 are retracted away from each other by actuating the handle 74 and worm screw 70. A workpiece 12 is loosely placed in the chuck 22 with the free end 13 extending between the pairs of rollers 60, 62, and 64 and 66. The lever is actuated to move the worm gear 70 and move the first support 50 and the second support 52 inwardly equally and simultaneously towards the axis 15 to center the workpiece 12 relative to the axis 15. The chuck 22 similarly clamps the other end of the workpiece 12 and the workpiece 12 is then axially aligned quickly and simply on the axis 15. It is to be noted that the self-centering steady rest 40 will engage and center a workpiece 12 with the axis 15 regardless of whether the workpiece 12 is undersized or oversized so long as the workpiece 12 is cylindrical.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. A self-centering steady rest for supporting the free end of a cylindrical workpiece held in the chuck of a drilling machine having a pair of ways and a drill tool support slidably supported from the ways comprising,
   a base adapted to be secured to the ways of the drilling machine,
   a first support including a first pair of supporting rollers and movably connected to the base on one side of the axis of the chuck,
   a second support including a second pair of supporting rollers and movably connected to the base on the opposite side of the axis of the chuck from the first support,
   said first and second supports being positioned for supporting the first pair of rollers and the second pair of rollers an equal distance from the axis of the chuck,
   means connected between the base and said first and second supports for simultaneously and equally moving said first and second supports toward the axis of the chuck for engaging and supporting the free end of the workpiece coaxially with the chuck axis,
   said means for moving the first and second supports includes,
      an arm connected to one of the supports,
      a pivoting lever connected to the other of said supports, and
      actuating means connected to the arm and lever.

2. The apparatus of claim 1 wherein the actuating means includes a worm gear and a coacting rotatable nut.

3. The apparatus of claim 1 wherein first and second supports are slidably carried on each side by a vertically extending track and the means for moving the first and second supports are connected to the first and second supports between the tracks.

4. The apparatus of claim 1 including,
locking means for locking the first and second supports in a fixed position.

* * * * *